Nov. 2, 1971              D. F. OTHMER              3,616,653

REFRIGERATION IN CYCLES OF FREEZING AND MELTING

Filed Oct. 4, 1967

*INVENTOR.*

DONALD F. OTHMER

3,616,653
REFRIGERATION IN CYCLES OF FREEZING AND MELTING
Donald F. Othmer, 333 Jay St., Brooklyn, N.Y. 11201
Filed Oct. 4, 1967, Ser. No. 672,755
Int. Cl. B01d 9/04
U.S. Cl. 62—58                                13 Claims

ABSTRACT OF THE DISCLOSURE

Two similar unitary vessels may be used in a refrigeration cycle to freeze solvent from a solution and to melt the frozen solvent crystals. While the first vessel is used for the evaporation step A, the second is used for the condensation step B. Then the cycle is reversed, with the first being used for step B and the second for step A.

---

The first vessel during A is the evaporator and is connected to the suction of a compressor, the refrigerant fluid is thereby evaporated to remove heat from an aqueous solution, part of the solvent water of which is frozen to ice. The unfrozen and more concentrated solution is drained off; the ice crystals may be washed by flowing in and then out an amount of fresh water. The evacuated vapors discharge from the compressor into the second vessel, the condenser for the B step, at a pressure high enough to condense on and melt ice crystals previously formed. The substantially pure water formed by melting the ice during B is drained as a separate product. The A step on the original solution, and the B step on the residual ice, then are alternated respectively in the vessels.

Essentially, the process accomplishes simply, with a minimum of equipment, the recovery of much of the energy required for the freezing of ice from the solution by the melting of a batch of ice crystals, previously frozen. Suitable heat exchangers of known type are used to precool the entering solution by the discharging of streams of cold fresh water and of concentrated solution.

The process may be conducted: (a) by lyophilization, i.e., direct evaporation of part of the water, freezing of another part, and concentrating a third part in the solution; (b) by direct contact refrigeration of the solution with a relatively less volatile and insoluble refrigerant, e.g., butane, which evaporates and condenses in direct contact with the aqueous phases—solution and ice during evaporation-freezing, and water and ice during condensation-melting; also (c) by indirect refrigeration with a relatively more volatile refrigerant, e.g., ammonia, which removes heat during A, and adds heat during B through the same heat transfer surface.

The process may be used for removal of nearly pure water from sugar, saline, and acid solutions, as sea water, fruit juices, waste liquors from wood pulping, milk, etc.; alcoholic solutions, e.g., beer.

The cyclic refrigeration process using a direct-contact refrigerant for the separation of water from solutions may be used with the formation, separation, washing, and melting crystals of gas hydrates. These are addition-compounds of pure water taken from the solution with molecules of a specially selected refrigerant, e.g., propane. The crystallization of solid hydrate takes the place of the crystallization of ice in step A; and the melting operation, to give fresh water in step B is also similar with the melting of the hydrate crystals by direct-contact with compressed vapors of the selected refrigerant.

The refrigerating process of this invention utilizes the conventional steps of: (a) evaporation of a refrigerant fluid while removing heat from and thereby cooling materials adjacent to the evaporation; (b) compression of the vapors so formed to a higher saturation temperature and pressure at which (c) condensation of vapors takes place to add heat to materials adjacent to the condensation. The essential feature is that, during the first half of a cycle, which is conducted in two similar zones or vessels, the evaporation-cooling step is conducted in the first vessel, while the condensation-heating step is being conducted in the second vessel; then the operations are reversed so that in the second or alternate half of the cycle, the evaporation-cooling step is conducted in the second zone or vessel, while the condensation-heating step is being conducted in the first zone or vessel. The cyclic process continues in alternating the operations between the two zones or vessels.

One embodiment of this invention for the freezing of ice from a solution, usually aqueous, uses alternately refrigeration and heating in a cycle in a first zone or vessel. Herein ice is formed during the refrigeration by evaporation and evacuation of the vapors of a refrigerant fluid while cooling the aqueous solution and freezing ice therefrom. This is called Step A. The more concentrated solution is then drained from the ice crystals; the refrigerant cycle is reversed by compressing the vapors of the refrigerant fluid back into the first zone which is now heated by the compressed vapors as they condense to melt the ice crystals. This is called Step B. The water formed by the melting, essentially pure, is removed; a new charge of feed solution is added; and the process is repeated. Simultaneously, the steps are being cycled exactly out of phase in a second zone or vessel; so that the condensation-heating-melting of ice—Step B—is taking place due to compression of vapors of the refrigerant which are passed into the second zone, while the evacuation of vapors in the first zone is causing the evaporation-cooling-freezing of ice from the solution—Step A.

Then the reverse or alternate processing takes place. Evacuation of vapors in the second zone now causes evaporation of refrigerant with cooling and freezing of ice from the solution at the same time compression of vapors in the first zone causes condensation of refrigerant vapors with heating and melting of the ice crystals previously formed. Repetition of the cycle concentrates batches of the solution and produces essentially pure water, also in batches.

The refrigerant fluid may be the water in the solution (lyophilization), a water-insoluble refrigerant in direct contact with the solution—and later with the pure ice crystals, or a refrigerant removing heat from the solution to freeze ice and later supplying heat to melt the ice through the same heat transfer surfaces.

A prime aim in any heat transfer process is the minimization of the temperature difference between the low and the high temperatures of the process. In Step A, the lowest temperature is the freezing point of ice out of the solution at its maximum concentration. (In the case of separating ice from sea water, usually the concentration is doubled from about the usual 3.5% to 7% solids content—principally sodium chloride.) This gives the maximum depression of the freezing point, and may be called D°.

In a continuous freezing operation, the ice is being frozen at the same maximum concentration; hence freezing point, as the brine is being withdrawn. Thus all ice is formed in contact with strongest brine—greatest concentration of salt to be occluded in crystals—also lowest temperature with maximum refrigeration effect required.

With the batch operation of this invention, the ice starts to freeze at 3.5% concentration of the feed and continues to freeze up to the maximum concentration 7%, with only the last being formed under these, the most adverse conditions as to (a) lowest refrigeration effect required, (b) greatest tendency for impurities, (c) slowest rate of freezing. (These concentrations are based on the usual operation of freezing fresh water ice from sea water.)

The ice so formed is supercooled below its melting point—that of pure water. When solution is removed, it must be heated to this melting point (° C. or 32° F.) before it melts. This melting point of pure ice is practically independent of any change of pressure which would be encountered in this process and is assumed to be fixed at ° C. or 32° F.; and any higher temperature of surroundings—vapor, liquid water or metal surface—will cause heat to flow to the ice and melt it.

Thus, to cause the ice to melt, the vapors must be at a slightly higher temperature than the melting point of ice. This may be called ΔM°. Obviously the values of both ΔF and ΔM will depend greatly on whether the process uses lyophilization, direct contact refrigeration, or indirect refrigeration across heat transfer surfaces. However, the total temperature range will be ΔF°+D°+ΔM°.

The compression range required for the process to proceed with a given refrigerant, whether the vapor of water itself, i.e. lyophilization, direct refrigerant, or indirect refrigerant, will be indicated by the range between the vapor pressures at the lower and the upper range. The greater this pressure range, the greater will be the power requirements of the system. Thus, the proper selection of the refrigerant to minimize these ranges is important.

Water is the usual solvent separated in this process—as "fresh" water, substantially below 500 parts per million, which is recognized as an upper limit for potability. However, other liquids which have suitable freezing properties under appropriate operating conditions may be separated similarly from their solutions; but water will be used as an example to represent or express the use of the process with any solvent.

Many aqueous solutions may be concentrated while separating substantially pure water therefrom, including those containing dissolved solids, e.g., naturally occuring solutions of solids in sea water, brackish waters, etc., also industrial solutions, e.g., of salt, sugar, extracts of coffee and other materials, waste materials from pulping wood, etc. The aqueous solution may be of a liquid, e.g., alcohol—as brewers or distillers beer, acetic acid and formic acid, in those dilute concentration ranges where water freezes out as pure ice; acetone, methanol, methylethyl ketone, and other organic liquids as present in dilute solutions coming from operations for solvent recovery by absorption; glycerol; sulfuric acid; etc.

In many cases, it is possible to achieve the well known advantages for freezing processes of dewatering as compared to evaporation. These advantages include, among others (a) nearness to usual ambient temperatures, hence a minimum of heat interchanging; (b) relative intensitivity of materials of construction to corrosion at the low temperatures; (c) lack of scale-forming tendencies for most aqueous solutions; (d) low energy requirement for phase change in freezing compared to boiling; (e) retention of flavors otherwise lost in evaporation; (f) lack of decomposition of heat-sensitive materials. In concentrating sugar solutions, for example, the low temperature of freezing eliminates the inversion or carmelization which may occur in boiling operations.

However, there are the well known disadvantages of freezing processes: (a) relative expense of removing heat below ambient temperatures compared to cost of adding it, and (b) relative difficulty of separating solids—ice crystals—compared to separating vapors.

Sea water often my be considered hereinafter as an example of the solution; and the concentrate—that obtained by removing what may often be approximately an equal volume of fresh or "sweet" water—will be called "brine."

The solvent itself is used as the refrigerant fluid in lyophilization. In aqueous solutions, this is water. Water has a major disadvantage of a large vapor volume—3300 cubic feet per pound at its low pressure of 0.0887 pound per square inch at the freezing point, 32° F., compared to 26.8 cubic feet per pound at the atmospheric boiling point 14.696 pounds per square inch and 212° F. The latent heat is higher—1019 B.t.u. per pound, but only 0.308 B.t.u. per cubic foot of vapor. However, the lyophilization process is simple as compared to those using another refrigerant.

By comparison, ethyl chloride, which, like butane, is one of the refrigerants which may be used for direct contact refrigeration, has at 32° F. a vapor pressure of 8.99 pounds per square inch, a specific volume of 9.21 cubic feet per pound, and a latent heat of 172.5 B.t.u. per pound, or 18.7 B.t.u. per cubic foot of vapor. Thus, there would be required 18.7÷0.308=60.7 times as large a volume of water vapor as of ethyl chloride vapor, to carry the same amount of heat at 32° F. Other of the preferred refrigerants for direct contact refrigeration have greater or lesser ratios.

Whereas many suitable direct refrigerants which would be insoluble in the aqueous liquids involved are known to the art, the hydrocarbons, either saturated or unsaturated, containing four carbon atoms, may be used as an example; e.g., normal butane, isobutane, or such mixtures as may be commercially available—preferably, but not necessarily, of a greater percentage of isobutane, and with only such smaller amounts of propane, pentanes, or other homologous hydrocarbons, which may come in commercially available material.

Butane and isobutane, and their mixtures, have vapor pressures somewhat but not greatly above that of normal atmospheric pressure at the freezing point of most aqueous solutions which are encountered. This has some important and practical advantages. Also, they are cheap and readily available.

Sometimes the butenes may be cheaper, either singly, mixed with each other, or with butane and/or isobutane, as coming from a petroleum operation without separation. The general range of normal boiling points of the refrigerant mixtures thus will be from about −0.5° C. for the normal butane, to about −11.5° for the isobutane. It is desirable, but not necessary, to use liquids which exert slightly more than one atmosphere of vapor pressure at the freezing point of water.

Other materials, chemically stable under the operating conditions in this boiling range, also may be used as the refrigerant when water is to be frozen out of its solution. In some special cases as indicated hereinafter, where the process is used for dewatering solutions of organic liquids, lower temperatures are required—and these may be obtained in practice either by using the butane type under sub-atmospheric pressures, or by using propane or propane mixtures with the butanes, various of the chlorinated or chloro fluorinated solvents (trade names as Genetrons, Isotrons, Freons, etc.), methyl ether, and other liquids of similar boiling range down to −40 to −45° C.

These refrigerants have the disadvantage that a high pressure results if a vessel containing some quantity of one of these is allowed to come to normal ambient temperature. Also, there are disadvantages of hydrate formation with water in the case of propane and some of the others (including iso-butane -n, butane mixtures containing above about 75% isobutane), as well as undue solubility in water under the required pressures. Nevertheless, they may be used within their limitations, especially when the lower freezing temperature range is desired. Any desired boiling temperature may be obtained in this range by mixtures of the several liquids, in such ratios of components as will boil at the given temperature.

When the term "butane" is used, it may be regarded as the general example of a direct refrigerant fluid, pure or mixture. If a specific refrigerant is intended, it will be referred to as "normal-butane" or "isobutane," etc. Other refrigerants than the $C_4$ hydrocarbons also may be advantageous for particular usages.

An indirect refrigerant is one used in such a way that the heat of its evaporation must be transferred first from the solution from which ice is being frozen through metallic walls of tubes or sheets, then its heat of condensation must be transferred a second time through the condensing surface—tube or sheet—to melt the ice on the other side. As compared to the direct refrigerants, much more volatile liquids are usually preferred in the range of volatility of propane, ammonia, methyl chloride, sulfur dioxide, or those of the chlorinated-fluorinated hydrocarbons of this higher range of volatility. Ammonia will usually be referred to as exemplary of indirect-refrigerants.

While the mechanical system of evaporation-compression-condensation for refrigeration will normally be the simpler and cheaper for this process where mechanical energy is cheaply available, the thermal system of evaporation-absorption-regeneration-condensation may be used instead. Thus, the lyophilization system particularly may be conducted with some advantage by an evaporation of water at the freezing point of the solution, with these water vapors at low pressure and high specific volume being absorbed in a hydrophilic aqueous solution. Examples of those of lithium bromide, lithium chloride, caustic soda, sulfuric acid as exemplary of inorganic materials whose concentrated aqueous solutions have even much lower vapor pressures than pure water at the freezing point; while organic materials would include glycerol, glycols, formamide, acetamide, etc. The absorption would be done in any usual absorber; or, more efficiently, in a multi-stage absorber, as described in U.S. Pat. 3,306,346.

The absorbing liquid becomes diluted; and it must be regenerated in an evaporator at a sufficiently high temperature to boil out the water which has been absorbed. This may be done at a temperature corresponding to a vapor pressure only slightly above that of pure water ice at its melting point. Because of the elevation of boiling point of the concentrated solutions, the temperature range may be substantially higher. Again, these water vapors will be passed to melt the ice crystals previously formed in the second vessel so that the energy effect is utilized.

The hot concentrated absorbing liquid leaving the regenerator is heat interchanged with the dilute liquor going to the generator. This also is of any standard design, or it may be of the vapor reheat flash type described in U.S. Pat. 3,306,346, which may improve the overall economy of fresh water production, if that is the purpose.

Since the thermal system of evaporation-absorption-regeneration-condensation for refrigeration accomplishes the same purpose of effectively compressing the vapors between the two values of operating pressure and temperature, just as does the mechanical vapor compressor; and since such systems are well known and not a part of this invention, they will not be described in detail. Suffice it to say that the use of terms "refrigeration cycle" or of "compressor" or "compression" indicates that either the mechanical system or the thermal system (absorption-regeneration) of compression may be used. The simple mechanical compressor, as diagrammed in the figures, thus is regarded also as representing the several standard components of the thermal compression system, i.e., absorption refrigeration, which are the absorber, the regenerator, and the heat exchanger together, with essential pumps and connections for this purpose.

Similarly, a standard part of any freezing-melting system of separation of water from a solution will be one or more heat exchangers for pre-chilling the feed solution, utilizing the cold concentrate and the cold fresh water produced, which, together, equals the amount of feed solution. Essentially the present invention is a batch process; and heat exchangers are best operated continuously. Thus, there may be storage reservoirs on either side to allow for continuous operation of the heat exchangers. The methods and equipment used for this highly essential part of the complete operation may be of any of the standard types of heat exchangers known to those skilled in the art. Since they have been well described elsewhere, they will not be detailed here, although they will, of necessity, be included in any plant operating the invention.

For example, it has been found that a particular effective pre-chilling of sea water in producing fresh water may be accomplished by a multiple-stage flash evaporation of a part of the warm sea water with the vapors being condensed by a vapor reheat system, as described in U.S. Pat. 3,306,346, using a counter-current contact with the cold fresh water from melting the ice. This gives an increase of water production of between 5 and 10%.

Similarly, open flash condensation of vapors on the cold concentrated brine in open flow may be used, as vapors flash from the evaporation-cooling of the sea water feed. These fresh water vapors are, of course, lost; but the high efficiency of the heat exchange may warrant this loss in relatively small plants. For simplicity, the stages may each have three zones: one for flash evaporation of the warmer sea water, one for the cold product water in open flow, and one for the cold brine in open flow. The warm feed circulates in one direction, the cold liquids in their respective zones circulate countercurrently thereto.

Another advantageous heat exchanger for this use is that described in U.S. Pat. 3,250,081 and co-pending application No. 556,787 of May 2, 1966, now U.S. Pat. No. 3,377,814 entitled Method and Apparatus for Producing Fresh Water from Slurry of Ice in an Aqueous Liquid. This utilizes liquid-liquid contacting with a liquid heat transfer medium such as naphtha. Like the multi-stage flash exchanger, no heat transfer surfaces are necessary.

Also, the deaeration of the feed sea water is always necessary; and suitable methods and equipment for accomplishing this essential step are well known and are not a part of this invention.

The cyclic operation in any one zone or vessel with alternate operations of (a) evaporation to give vapors which are evacuated, and then (b) compression of these vapors to cause their condensation, may be accomplished by means of an evacuator-compressor, which is inter-connected to another similar zone or vessel, wherein the reverse action is being accomplished.

By reversing the direction of rotation of the drive of some types of mechanical compressors, e.g., those of the Rootes-Connorsville type, or other type of positive displacement units, the branch of the vessel which has been the suction inlet will become the discharge outlet, and vice versa. Thus, such a compressor unit installed between two such vessels or zones may be rotated first in one direction to cause the evacuation from the first vessel, with compressed vapors going to the second vessel; then by reversal of the compressor unit, the process is reversed. This may be done by a mechanical reversing system of gears or other drive mechanism, or by an electrical reversal of the motor.

However, some types of compressors or blowers, notably those acting by centrifugal action, cannot have their action reversed—with the suction and discharge connections interchanged. Using such a compressor, it will always be operated with rotation in one direction; and the reversal of flow will be accomplished by means of valves which reverse the suction and discharge connections respectively to the two vessels, to cause the reversal of flow of refrigerant vapors. This may be done with a valved line from each vessel connected to the suction side of the compressor, and a valued line from each zone connected to the discharge side. By opening of one valve of each line, the flow can be directed in either manner desired, when the other valves are closed.

Simpler valve arrangements utilizing cylinder or other valves are well known to the art for accomplishment of such simple reversal of direction of vapor flow; and any one of these may be used with this invention.

When the thermal system of compression, rather than the mechanical compressor, is used as noted above with a vapor absorber, regenerator, and heat exchanger, it also is not reversible and requires the use of a valve arrangement for reversing or alternating the steps in the vessel.

Because of the change in function of the two vessels, alternately being at the high temperature and the low temperature of the system, it is desired that the mass of each vessel be kept at a minimum, because it must be heated and cooled with each cycle. For the same reason, any excess of either direct or indirect refrigerant fluid after completion of operation A is to be avoided, because it will have to be heated during operation B and then again cooled during the next operation A. Likewise, it is necessary to insulate thoroughly the equipment against more than a minimum amount of heat influx because of the cost of producing a corresponding amount of refrigeration. Furthermore, it is highly desired, for the same reason, that the temperature difference between the high and the low parts of the the cycle be minimized, so as to lessen these same heat inefficiencies.

To the heat removed in freezing ice in A must be added heat influx to the system, and heat removed in cooling the vessel undergoing A from higher temperatures of B, also heat due to inefficiencies of refrigeration. Consequently, more heat is added in B than required to melt the ice; and thus additional or auxiliary cooling must always be supplied in B by outside refrigeration.

A modified form of freezing process for separation of substantially pure water from a solution is that using gas hydrate crystals instead of ice crystals, as the means for separating a solid phase of water free of the solute.

Gas hydrates are known, such as those of various halogenated hydrocarbons, of gaseous hydrocarbons, of chlorine, of carbon dioxide, etc. One of the most studied hydrocarbons in its formation of gas hydrates is propane, which is cheap, readily available, and non-toxic.

Propane may be used as the direct heat transfer medium and working fluid in the refrigerating cycle A of the present invention. It is almost insoluble in water, and the hydrate which is formed is at a temperature above that at which ice forms. The crystallized propane hydrate contains a molecular ratio of water to propane between about 17 to 1, and 18 to 1.

In the presence of propane, the freezing temperature of water in the form of this hydrate in contact with pure water is raised from 0° C. to 5.7° C. This increase in the effective freezing point of water, 5.7° C., is practically the same for each concentration of salt therein. Thus, a 6% solution crystallizes the hydrate at 1.9° C., while it crystallizes ice at −3.7° C., a difference of 5.6° C. The heat of fusion of water as ice and a hydrate are practically the same.

Freezing of hydrate by propane as a direct contact refrigerant from 7% salt solution is at a temperature of 1.7° C. and a pressure of about 4 atmospheres.

Melting may then be done at a higher pressure of about 5 atmospheres, and a temperature of about 7° to give pure water (heavier) and pure propane (lighter), which separate immediately into two layers for decantation.

The washing of the hydrate crystals is done exactly the same as washing the water crystals, either by fresh water or by the condensation of propane at the higher pressure on the surface of the hydrate, to cause a surface film of brine to be removed.

There are advantages in the use of hydrates instead of ice in that the temperature of solidification of water in the hydrate form is higher, and thus there is less heat lost in the system which is nearer the ambient temperature. However, the pressures are also higher.

The process of this invention has been found to be eminently suitable for operation with gas hydrates. The steps are the same as of operation A, the solidification of ice in the form of hydrate molecules instead of molecular water, the separation of the crystals, their washing, and then the reverse operation B melting of the solid water (hydrate) through the utilization of the vapors of the hydrate forming refrigerant at the higher pressure, the same as in the use of the direct refrigerant process wherein ice is formed.

FIGURES

FIG. 4 is a diagram of the arrangement of the valves on the inlet and the outlet of the compressor 22 when it cannot be reversed. Herein the vapors from the left vessel I which is in operation A, pass through the left branch line 14–I, open valve 37 (closed valve 38), through the compressor 22, then through open valve 36 (closed valve 35), right branch line 14–II, and finally to the right vessel II which is in operation B. When the operations are reversed so that vapors flow from I to II with the compressor 22 still rotating in the same direction, valves 38 and 35 are open; while valves 36 and 37 are closed. This same diagram refers to the valve arrangement if 22 represents the entire assembly of an absorption refrigeration system, including a vapor absorber, regenerator for vapors, heat exchanger, etc. These items representing in effect a thermal compression of vapors between I in operation A and II in operation B, cannot be reversed; and the valve arrangement accomplishes this purpose.

GENERAL CYCLE

Figure 1:
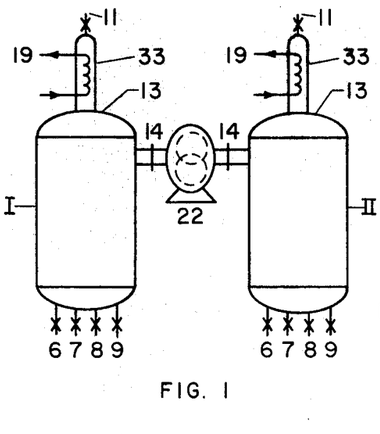
FIG. 1 illustrates a diagrammatic flow sheet of the general system, wherein the left vessel I of the two similar vessels may be in the freezing part A of the cycle; and the right vessel II may be in the melting part B of the cycle. This is effectuated by the action of the compressor in between the two vessels I and II evaporating and evacuating refrigerant vapors from the left vessel I to cause freezing of ice therein; and compressing and condensing the vapors in the right vessel II to cause melting of ice which has been previously formed therein.

The general refrigeration cycle of this invention is diagrammed in FIG. 1. Herein, during the first half of the cycle, evacuation of refrigerant vapors by compressor 22 removes heat from material in the left one of the similar vessels by the evaporation of the fluid refrigerant. These vapors having been compressed by 22 to a higher saturation pressure and temperature are condensed in the right II of the similar vessels to add their heat to material therein. The operation is reversed after the material in the right vessel II is removed and a fresh charge is added; during this alternate half of the cycle, the refrigerant fluid is vaporized in the right II of the similar vessels, to cool material therein; and the vapors are compressed by 22 to a higher saturation temperature and pressure and condensed in the left I of the similar vessels to add heat thereto and to any material therein.

In the freezing operation, a principal embodiment of the invention, solution is present in vessel I undergoing this operation A, and ice crystals are formed, due to cooling caused by the evaporation of the refrigerant fluid.

The bottom 3 of each vessel has four valved branches, i.e., the sea water inlet 6; the brine discharge 7; the wash water inlet and discharge 8; and the product water discharge 9. These branches are connected to the essential means for supply and withdrawal of the several fluid streams. Since 6 supplies sea water which has been precooled, and 8 and 9 remove cold product water and brine, respectively, the stream 6 is cooled in one or more heat exchangers by the cold streams 8 and 9. These are heat exchanging operations well known in the art; and while essential, they are not novel with this invention.

Side nozzles 14 near the top of each vessel I and II connect to the openings (each may be either for suction or for pressure) of a blower or compressor 22 connected to a driving motor or other source of energy, not shown. This compressor is reversible in direction, so that the direction of flow of refrigerant vapor may be in either direction. Several types of rotary, positive displacement blowers or compressors are reversible with slight changes in usual design of ports or impellers; e.g., two-impeller type, sliding vane type, and liquid piston type.

Sea water is first cooled by heat exchange with discharging brine and fresh water. Intermediary storage tanks may receive the fluids so that the heat exchanging is continuous while operations A and B are batch. The chilled sea water is charged through 6. The refrigerant fluid, vaporized by evaporation, passes out through the connection 14. After ice crystals are formed, usually to an amount of about half of the water in the solution, the now concentrated solution (brine) is drained off through 7, to a heat interchanging which cools the raw sea water feed. Washing may be accomplished on the crystals by ice cold fresh water added through 8 and then drained out also through 8. The ice crystals then are ready to be melted in the second half B of the cycle.

Meanwhile, during the evaporation and evacuation of the refrigerant in the operation A, vapors are compressed by 22 mechanically, or thermally by absorption-regeneration, so as to raise their temperature and pressure as they are passed to the operation B in the right vessel II. Their latent heat is now available at a high enough temperature to melt ice crystals present. The fresh water so formed is drained from the system through 9, with appropriate batch or continuous heat exchanging to prechill the raw sea water feed. Then the right vessel II is charged with sea water again, prior to reversal of the process, and becomes the freezer in operation A with evacuation of the vapors from it by the compressor 22 in the reversal of the cycle.

If an operation of perfect thermodynamic efficiency—without heat losses or gains—could be secured, the latent heat of the water vaporized in freezing a charge of ice formed in the A operation would be equal to that necessary to melt the ice in the B operation. Since there are always substantial inefficiencies, provision must be made to supply an additional refrigeration effect during the B operation—usually after most or all of the ice is melted.

The tops 13 of the vessels I and II have constrictions or branches which house refrigeration coils 19, supplied with an auxiliary circulating refrigerant fluid from outside at a temperature sufficiently low to condense refrigerant vapors which are not condensed by melting the ice previously formed. At the top of this auxiliary refrigeration system is a valved vent line 11, through which exhausts non-condensible gases to an external vacuum pump, not shown.

The simplest embodiment of the invention is by use of two similar vessels, with one operating at a lower pressure of the heat removal where there is evaporation of refrigerant fluid, and cooling, usually freezing, of ice—called the freeze or Step A operation. Meanwhile, the other vessel is at the higher pressure of the heat discharge where there is condensation of the refrigerant vapors and heating, usually melting ice—called the melt or Step B operation. The cycle reverses these operations. Thus, if the vessels are called I and II, the sequence will be: I is on A, while II is on B; then I on B, while II is on A; then I on A, while II is on B; etc. This may be indicated:

I–A, II–B; then I–B, II–A; then I–A, II–B; etc.

It may often be desirable to have a longer time on step A than on step B; and this may be accomplished by having three similar vessels, I, II and III. Thus, two of the vessels may always be on A, with one of them starting while the other is finishing. The third one is on B for one-half the time any one of the vessels is on A; and as one vessel leaves A to go on B, the other one on A remains on A and the one finishing B starts on A. The cycle may be indicated:

I–A, II–A, III–B; then I–B, II–A, III–A;
                                  then I–A, II–B, III–A The cycle then repeats itself indefinitely.

Other arrangements of a larger number of vessels also may be provided to vary the relation of the time on step A to the time on step B.

A variant of the process of this invention is indicated above—the formation of gas hydrates instead of ice crystals in step A, their separation from brine, and their melting in step B.

LYOPHILIZATION

In FIG. 2, again as described above, the two vessels I and II each alternately do the evaporation-ice freezing operation A, and the condensing ice melting operation B. The numbers of the parts of FIG. 1 also refer to the numbers of the parts of FIG. 2, which have the same function. There are some additional parts and some additional operations in Lyophilization.

Figure 2:
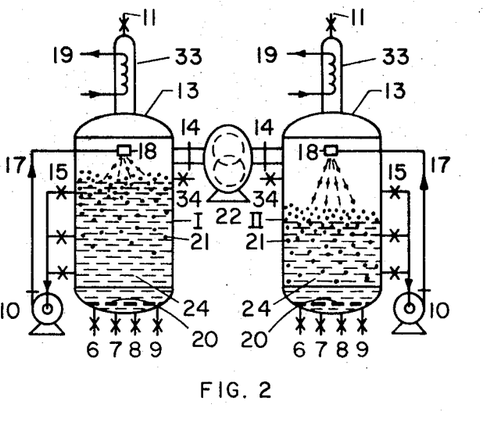
FIG. 2 represents the method being conducted as a lyophilization, wherein water from the solution is being evaporated as refrigerant vapors in the left vessel I, thus self-cooling and freezing to ice some of the water in the solution due to the evacuation by the compressor. Simultaneously, water vapor is being condensed in the right vessel II to melt ice crystals formed in the previous cycle. This same figure may also illustrate, as hereinafter described, the use of a direct refrigerant fluid other than water, in contact with the freezing solution during A and in contact with the ice during B.

Side connections 15 to the vessels I and II have valves at various levels to allow withdrawal at any desired level. These connect to the suction of pumps 16, which discharge the liquid withdrawn from the chosen level of the vessel through 17 to spray heads 18.

The levels of the liquid 24 in the similar vessels I and II will vary during the several steps of the operation to be described. Ice crystals 21 are forming during the operation A, and are being melted during the operation B. They will be supported by the false bottom 20, on top of which is a suitable screen.

FIG. 2 shows the lyophilization operation wherein the water of the solution is itself the refrigerant; and by its evaporation due to the evacuation of vapor from the left vessel I the solution is cooled and some of its water is frozen. Sea water will be considered as an example, originally at 3.5% concentration of salts (assume sodium chloride). Here at the end of the cycle, when the concentration of the solution is doubled to 7.5% by freezing out of solvent water as ice, the freezing point of the ice may be approximately $-4.3°$ C. If a driving force—say of $0.5°$ C.—is required to cause freezing to proceed at a reasonable rate, the temperature of the bulk of the solution at the end of the freezing operation would be lower by $0.5°$ C., or $-4.8°$ C. Its vapor pressure would be about 3 mm. of Hg. This is the lowest pressure and temperature encountered. Since this is a batch process, most of the water evaporated to freeze the ice would be removed at a slightly higher pressure and temperature, an advantage compared to a continuous freezing process where all freezing is done at the highest concentration and the lowest temperature.

The driving force necessary $\Delta M$, to cause the condensation of the compressed water vapors to take place at a reasonable speed, has been found to be between about $0.3°$ to $1.5°$ C. On the pressure scale, this is between about 0.1 and 0.5 mm. above the vapor pressure 4.58 mm. Hg of pure ice; or an absolute pressure of about 4.7 to 5.1 mm. Hg. This, plus any friction losses, is the discharge pressure of the compressor.

The operating compressor range may thus be between about 3.0 and 5.0 mm. Hg. This does not include the effect of friction losses nor of non-condensible gases which will exert their relatively small partial pressures, although they will be, in the main, removed by standard methods well known in the art.

After a sequence of operations has been established the right vessel II ready for operation B remains from the previously operation A filled with crystals of ice of an average diameter of about 0.3 to 0.9 mm., which will already have been drained of brine and washed with fresh water.

The left vessel I will be empty; and sea water prechilled by heat interchanging with the cold brine and the cold product water will be added to fill the vessel almost to the branch 14, while the vent valve 11 is open to a vacuum pump and no refrigerant is being passed in 19. The vessel is evacuated from 11 by an external vacuum pump, not shown, to eliminate non-condensible gases. Vent 11 is then closed, while the vent 11 of the right vessel II in operation B continues to be connected to the external vacuum pump; and refrigerant is circulated in 19 to condense any water vapor. Compressor 22 is started, and when the pressure in the left vessel I goes down to about 4.4 mm., the sea water is cooled to its freezing point and the vent 11 of the right vessel I is closed.

Desirably, no non-condensible gases would be present because of the necessary low pressure required. Some present in the vessel before being charged with sea water must be purged—also those in the sea water itself. However, gas solubility increases as temperatures decrease from that of the sea to that at the freezing point. Thus, some gas may remain dissolved in the ice cold brine discharged. Also, some will be reabsorbed in the ice cold fresh water sprayed into the vessel during B. Meanwhile, as much as necessary may be exhausted by the vents 11 to vacua during parts of both operations A and B.

The pump 10 of the left vessel I undergoing operation A is started, to recirculate the sea water from a level chosen by selecting the valve of the suction pipe 15. A spraying of chilled sea water through spray head 18 causes evaporation-cooling-ice freezing to take place at the lower pressure developed by 22. Ice crystals formed in suspension recycle in vessel I undergoing operation A and the spray in the vapor space above the liquid, until they build up to a size of 0.3 to 0.9 mm. The size of the crystals may be varied, larger crystals being secured usually with a greater rate of recirculation of the slurry. Water vapors pass to the right vessel II undergoing operation B, where they contact, condense on, and melt the previously drained ice crystals. When a substantial amount of fresh water is formed from the melting and condensing, pump 16 is started. This water, as a slurry with melting ice crystals, is passed through lines 15 and 17 to spray head 18. The ice in the spray is melted as the compressed vapors condense.

Meanwhile, in vessel I of operation A, and particularly due to the spray of the spray head 18 of ice crystals in brine, there is an evaporation of water and a continuing cooling with freezing of the crystals which grow to the desired size. When the operation has continued so that the ice crystals are being frozen out of a brine of about twice the original concentration, the process is stopped.

The spray of brine with ice crystals growing therein as water evaporates therefrom during A, is an example of the excellent heat transfer from a slurry dispersed in a vapor space. Comparable is the reverse flow of heat to the spray of a slurry of ice crystals in the substantially pure water formed as they melt. This also gives excellent heat transfer, as noted for vapors of a direct contact refrigerant in co-pending application No. 556,787 of May 2, 1966, entitled Method and Apparatus for Producing Fresh Water from a Slurry of Ice in an Aqueous Liquid.

A low temperature refrigeration fluid may be circulated through the coil 19 of the right vessel II undergoing operation B, to condense those vapors formed in freezing ice in the left vessel, but not capable of being condensed by the amount of ice present in II for operation B because of the inefficiencies of the operation. This refrigeration in 19 may start after most of the ice is melted in II.

When the concentration in the left vessel is at the desired point—as indicated, for example, by its temperature—the compressor is stopped; and the left vessel I, where operation A has just been completed, remains filled with a slurry of ice crystals suspended in the brine due to the action of its pump 16. Pump 16 is stopped, the crystals are allowed to settle upwardly, which they do rapidly because of their size. A screen on the false bottom 20 of the left vessel I will support the crystals; the valve 7 is opened; and the brine is allowed to drain and discharge through a heat exchanger, not shown, to be warmed by precooling the seat water feed.

When the brine has drained satisfactorily, a wash of fresh water at the freezing point is allowed to flow in over the crystals and then is drained rapidly. This washing may be obviated by allowing a first condensation from the subsequent step B of the cycle to accomplish this washing with a film of condensate-melt. This is separated off before collecting the main body of fresh water, melted and condensed.

Meanwhile, in the right vessel II, wherein operation B has been completed, the fresh water which has been formed is drained out through the valved line 9 as a cold product. It is heat interchanged against the warm sea water feed. The empty right vessel II then is filled with pre-chilled sea water and the process continues, with the right and left vessels alternating operations A and B.

In the drainage of both the brine and the fresh water, heat interchanging is accomplished to pre-chill the sea water entering. This may be done in batch or continuous fashion, by methods well known to the art.

DIRECT CONTACT REFRIGERANT

The same flow diagram, FIG. 2, illustrates also the operation with a direct refrigerant of the type of butane. As compared to lyophilization, with water itself as the refrigerating fluid, it is not necessary with direct refrigerants of this type to use the low pressures of a few millimeters of mercury, i.e., a relatively high vacuum. Usually, substantially atmospheric or somewhat above atmospheric pressure is used for the evaporation and condensation phenomena.

With butane, for example, the latent heat of evaporation is about 165 B.t.u.'s per pound; while with water, also at about the freezing point, the latent heat is 1073. Thus, there must be 6.5 times as many pounds, or 11.2 times the volume of liquid butane evaporated as water, to secure the same cooling effect. However, because of the low volume of water, there must be many times as large a volume of water vapors as butane.

Also, with lyophilization, the water evaporating out of the solution is condensed to give that much additional fresh water, and indeed, about .134 pounds of water must be vaporized for every pound of ice. When this is condensed as fresh water from the vapor phase, it adds to the fresh water which comes from the ice phase. On the other hand, in the direct refrigerant, there is about .87 pounds of butane vaporized per pound of water, but this is decanted away from the fresh water and is re-used, rather than being useful as a direct product.

In the direct-contact refrigerant, a large volume of liquid butane must be added as a refrigerant; and this reduces the volume available to be charged with solution or sea water and for ice in the two vessels.

Another consideration is that butane or any such refrigerant has a vapor pressure of several atmospheres or more if the vessels are allowed to come to ambient temperature with refrigerant therein. The vessels either must be designed to withstand this pressure, or provision must be made for draining the vessels to other suitable tanks. Also, butane is flammable, although there are refrigerants in this class which may be used that are not flammable.

All of these relative advantages and disadvantages must be considered in determining whether the operation is to be conducted with a direct-contact refrigerant, or by lyophilization, providing that the heat transfer surfaces of the indirect type are not desired.

If the operation is conducted with a direct-contact refrigerant, as butane, in FIG. 2, the cycle of operations will be somewhat the same as for lyophilization. Prior to operation A, there would be a relatively large volume of liquid butane charged into the left vessel I through the valved line 34. The correct valve in the suction line 15 is selected near the interface with the upper layer of butane, so as to withdraw first water and butane; and then, as chilling proceeds, water, butane, and ice crystals. This liquid-ice slurry sprays in the space above the butane, and then falls through the upper level of the butane in the vessel, while evaporation of butane and cooling and freezing of ice crystals proceeds.

Vapors of butane compressed by 22 fill the space of right vessel II and surround the ice crystals 21. The vapors condense, and the crystals melt, to give a layer of liquid butane floating on water. This liquid butane, water, or a slurry of ice crystals in either or both, is withdrawn from the right vessel II through the appropriate valve on 15, then forced by pump 16 through line 17 and spray head 18. Again, the spray gives excellent contact of liquid-solid slurry with vapor, so that there is good heat transfer with the compressed butane vapors so as to melt the ice crystals.

As with lyophilization, the ice crystals may be washed with ice cold water before condensation of vapors. Instead, again, a preliminary short condensation will melt on and wash off a surface film of water from the ice crystals. This goes to bottom and may be decanted from butane before main melting starts.

As evaporation of butane proceeds in left vessel I, it may be desirable to add additional butane or sea water to take its place. However, at the end of the operation substantially all of the butane may be evaporated, at the same time the brine concentration comes to its desired value, by freezing out the requisite amount of ice. Desirably, the left vessel would be filled as completely as possible in order to obtain the maximum capacity of the batch.

Meanwhile, to accommodate the additional butane which will be condensed in the right vessel II, and would fill it, some of the fresh water which is formed and which decants to the bottom of the vessel may be withdrawn through line 9 during the operation B. Also, a stream of butane may be withdrawn from the upper surface of the liquid in the right vessel II, through the valved withdrawal line 34, which is connected to a suitable storage vessel for the butane.

When operation A is finished in the left vessel I, there is a condensation of the last of the butane evaporated by the auxiliary refrigerant flowing in coil 19 on the right side, fresh water formed is withdrawn by decantation, leaving the liquid butane in the right vessel II at finish of B and ready to start A.

Butane is substantially water-insoluble, and only very little indeed is dissolved in the fresh water withdrawn and in the brine withdrawn. These very slight amounts of butane will be almost immediately evaporated, if the fresh water is kept in open storage, and if the brine is returned to the sea, because of the high vapor pressure of the butane. The direct liquid-naphtha-contact heat transfer may be used, as described in U.S. Pat. 3,250,081 and co-pending application 556,787 of May 2, 1966, entitled Method and Apparatus for Producing Fresh Water from Slurry of Ice in an Aqueous Liquid. As noted therein, the naphtha will dissolve most of any dissolved butane. Similarly, the naphtha will dissolve and allow the recovery of any propane or other hydrocarbon or chlorinated hydrocarbon gas used as a refrigerant, which forms, with water, gas hydrates to crystallize out instead of ice in the usual process.

When this invention is used with gas hydrates such as those of water with propane, as the direct contact refrigerant, the operations A and B are done in the same steps as with the formation of ice crystals by the direct refrigerant such as butane. The operation of A, as described above, in the presence of propane, will solidify a hydrate of about 17 to 18 molecules of water to 1 of propane at a temperature of about 1.7° for the 7% salt solution resulting from a concentration of sea water of 2 for 1. The brine is drained off, there is a washing with water to remove the surface film of brine on the hydrate crystals. This may be by washing with fresh water, or it may be by condensation at a higher pressure of the propane vapors in melting a surface hydrate layer. The relatively greater volatility of the propane at 1.7° C. requires a pressure of about 4 atmospheres for the conduction of operation A.

During the operation B, the cycle is reversed either by reversing the compressor as above indicated, or by reversal of suitable valves; the melting operation B is conducted at a temperature of about 7° C. and a pressure of the propane now of approximately 5 atmospheres. Thus, the compression ratio on the refrigerant fluid is about 5 atmospheres for condensation-melting, to 4 atmospheres for vaporizing-freezing. The melted water is decanted as before, separated from the propane, the propane is reused by keeping in the same vessel after the operation of B in the reversal of the process, so that this vessel then operates the A or freezing cycle after a charge of fresh sea water or other solution.

The alternation of A and B of the process is thus identical as before, with a different direct contact refrigerant, with different pressure ranges, and with different temperature ranges. The crystals are of hydrate containing about one in 18 molecules of propane, but the volume is only slightly different. The heat quantities are practically the same as when pure water is the solid phase. Other direct acting refrigerants, e.g., some of the chlorinated hydrocarbons, may be used instead of propane.

INDIRECT REFRIGERATION

In indirect refrigeration, the same cycle of alternately cooling-freezing and warming-melting is conducted in similar vessels, either of which may first be the evaporator and then the condenser, while the other is the condenser and then the evaporator. This may be illustrated by the diagram of FIG. 3.

Figures 3, 5:
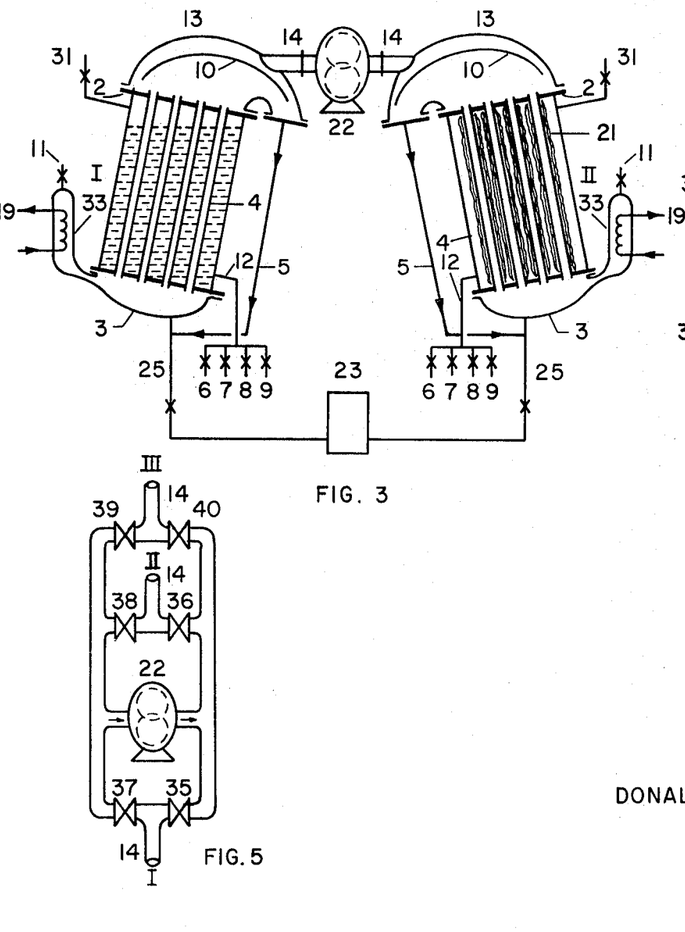
FIG. 3 shows the method using an indirect refrigerant which is evaporating in the tubes of the left vessel I, to cool the solution and to freeze ice crystals on the outside or shell side of the tubes. The corresponding tubes of the right vessel II are simultaneously being used to condense these vapors to melt ice previously formed on their outside surfaces.
FIG. 5 is a diagram of an arrangement of the valves connecting three vessels I, II, and III to the suction and the discharge of the compressor operating in one direction so that any two of the vessels, e.g., I and II, may be on the suction side (operation A), while the third one III is on compression side (operation B).
Figure 4:
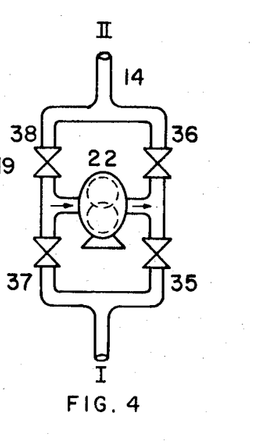

Here, it is necessary to transfer heat first in one direction and then in the other through the walls of tubing as indicated, although plates as heat transfer surfaces may also be used very satisfactorily. Each of the similar vessels I and II may be placed at a slight angle from the vertical, as indicated, better to accomplish the drainage of fluids from the flat surface of the bottom tube sheet. Tube sheets 2, top and bottom, have tubes 4, inside of which is a refrigerant of the type of ammonia. This evaporates inside the tube during the operation A, and condenses inside the tube during the operation B. During the evaporation of the ammonia, a relatively high velocity (and hence high heat transfer coefficient) is achieved in the tubes; as the ammonia evaporates, the vapors expand upwardly. A mixture of liquid and vapor discharges and impinges against the deflector 10, with the vapors discharging around the deflector, thence to branch 14, and hence to the compressor 22, while the liquid is guided inside the deflector and drains out through pipe 5, and goes back to recirculate through the bottom 3 to the inlet of the tubes. A long tube evaporation of the ammonia thus is achieved. Other types of units which will allow use both as an evaporator and as a condenser are possible and the design of such equipment is standard and not a part of this invention.

In the condensing operation B, simultaneously being conducted in the right vessel II, the compressed vapors of ammonia coming from branch line 14 into the dome 13 and the tops of the tubes are condensed; the condensate drains out the bottom of the tubes and discharges from the bottom 3 through line 15 to a receiver 23.

The valved lines 25 on ammonia drainage are usually open for flow, since the level of ammonia or similar refrigerant may be adjusted in the reservoir 23. Thus, during the operation A, the pressure is reduced in the left vessel; and liquid ammonia is drawn up from the reservoir 23 by the suction exerted on the left side due to the action of 22, and also due to the compression on the other leg of 25 connected to the right vessel bottom 3. The combination of right 25, the reservoir 23, and left 25 is, in effect, a manometer. The supply of liquid ammonia to the bottom of the tubes in the left vessel I during operation A may thus automatically be provided as needed for the evaporation. On the other side, the drainage of condensed ammonia from the right vessel II undergoing operation B immediately allows the liquid ammonia to pass down to the reservoir 23.

On the shell side of the tubes, the cooling and freezing operation of the brine is conducted during operation A, but in this case the ice 21 forms out of contact with the refrigerant, outside of the tubes, and adheres thereto. The rate of formation is such that, as in the case of the lyophilization or direct-contact refrigeration, pure ice is formed with substantially no occlusion of salt or other dissolved solids.

When the ice has built up to an optimum thickness of 1 to 6 millimeters, and the rate of heat transfer thereby is reduced in the operation A by the additional resistance which the ice gives to heat transfer, the sequence of operation is as with other forms of refrigeration. The brine is allowed to drain off through 7, and ice-cold wash water enters, and after contacting the ice; leaves through 8. Meanwhile, the vapors from operation A which are compressed by the compressor 22 to the higher pressure of the tube side of the right vessel II during the operation B, cause condensation of ammonia inside the tubes. The heat of condensation of the ammonia vapors is passed through the tubes to melt the ice crystals 21, which had been previously formed on the outside of the tubes in the shell space. Drainage of the fresh water is via line 12 and the product line 7. Any ice which scales off the tubes and falls in the narrow spaces between the tubes is also entirely melted by the contact with the tubes and the surrounding water.

As with lyophilization and direct contact refrigeration, the right vessel II in which operation B has just been finished, is now charged on the shell side with sea water to start operation A, while the left vessel I in which operation A has just been completed has ice coating the outside of the tubes, and is ready to start operation B.

Here again, the sea water which enters through 6 has been pre-chilled—either batch-wise, or continuously with intermediary storage—in an external heat exchanger, not shown, which meanwhile heats the brine discharge from 7 and the product water discharge from 9.

Usually, the maximum thickness of the ice on the outside of the tubes is between 1 and 6 millimeters. As the ice becomes thicker, the rate of heat transfer is automatically reduced, and the rate of ice growth is reduced. Thus, the tendency to retain salt or sea water is reduced at that part of the cycle where the concentration of salt in the brine is highest and there would otherwise be expected to be the maximum amount of impurities formed in the ice.

FIG. 3 illustrates diagrammatically a shell and tube type of unit for heat exchange with an indirect refrigerant such as ammonia in what is substantially a long tube vertical recirculating type of evaporator. Of equal utility is the plate-type of heat exchanger or evaporator. In this process, ammonia is being evaporated and ice is forming on opposite surfaces of each plate during A; and ammonia is condensing and ice is melting on opposite surfaces during B.

Plate units for evaporating and condensing are well known in the art; and their design is not a part of this invention. However, plate units have advantages because they may be designed with chambers of greater uniformity of heat transfer for freezing than tubular units, and with greater bulk capacity for the solution being frozen for a given mass of metal. As previously noted, it is important to minimize efficiencies associated with heating and cooling metal parts during this cyclic operation; thus plate units have major advantages.

Plates for heat exchangers are often pressed with corrugations or "dimples," to increase their rigidity and their surface area. Suitable methods have long been known for assembly of such plates with gaskets or by permanent attachment: welding, brazing, soldering, etc. Systems of openings or ports for flow of liquid or vapors in and out are also well established.

A pack of as many as 50 to 100 plates may be arranged as playing cards alternately face-to-face and back-to-back, with alternate spaces for the evaporing liquid which is absorbing heat, i.e., between the faces of each pair of adjacent plates. Here, these spaces may be the space for the refrigerant, i.e., the ammonia side. In the other spaces or chambers—between the backs of each pair of adjacent plates—is the fluid which is supplying the heat, in this case sea water being frozen. To allow rapid drainage or brine from the ice formed on the plates during A, and or water from melting during B, it is desirable that these spaces or chambers for solution have smooth, vertical, or nearly vertical surfaces. The spaces for evaporating ammonia may allow flow of refrigerant at a direction which is either parallel (i.e., also vertical), or at right angles (i.e., horizontal) to the vertical flow on the water side. The construction of these types of plate heat exchangers is well known and standard for streams either parallel to each other or at right angles to each other; and well established designs may be immediately utilized for the present purpose.

Usually there would be two banks or "decks" of such plates I and II, with the compressor between. However, it is also possible to operate with three banks, i.e., vessels I, II, and III. In this case, the two operations are conducted in a cycle so that two vessels are always on freeze operation A and one vessel is always on melt operation B as above.

Also, it is possible to operate with 22 representing either a mechanical compressor or a thermal compressor, i.e., the absorber-regenerator system described above.

TIMING OF OPERATIONS

Under most operating conditions, plant designs and specifications for lyophilization, direct refrigeration, or indirect refrigeration, the time required for the optimum amount of crystal growth during operation A will be from about 60 minutes to 90 minutes, although this may vary with different units and solutions being processed from about 30 minutes to 300 minutes.

The usual or general operation of A includes for either lyophilization, direct refrigeration, or indirect refrigeration: (1) the filling with dilute solution; (2) the freezing operation proper; (3) the drainage of the concentrated brine; (4) the filling with ice-cold wash water, and (5) the drainage of the wash water. Similarly, the usual operation of B includes: (1) the melting of the ice and (2) the drainage of the fresh water.

Because of the greater number of functional steps in A than in B and also because the rate of heat transfer may be expected to be higher in condensation than in freezing, the operation A may usually, and advantageously be allowed more time than operation B. If the compressor always operates in the same direction, and a valved arrangement of the vapor connections between the units and the compressor is used, it is possible to use a triple unit instead of a twin. In this case, A is being started in the first unit, I, while A is being finished in the second unit, II, and B is being conducted in the third, III. When operation A is finished in II, this is started with operation B, and operation A starts in III and continues in I. The cycle continues with two units always on A and one unit always on B.

This is illustrated diagrammatically in FIG. 5, wherein valves 35 and 37 control connections to 14-I, valves 36 and 38 to 14-II, and valves 40 and 39 to 14-III. In this illustration, A is allowed in I and II by suction through open valves 37 and 38, and closed valve 39; while B is allowed in III by open valve 40, and closed valves 35 and 36. To finish operation A in II, and start operation B while finishing operation B in III and starting operation A; the valves 38 and 40 would be closed, and valves 36 and 39 would be opened—leaving valves to I unchanged (37 is open and 35 is closed).

Either there may be used a valve manifold system such as that of FIG. 5 for the same compressor 22 with six valves and three branch lines 14, one to each of the three units; or a single barrel valve, a cylindrical rotating device, may be used so that two units are always on A, and one on B. This gives twice as much time for A in any one unit as for B. Other modifications with other ratios of number of units on A to number on B, with correspondingly more complicated valve arrangements, may be devised if other ratios of time in A to time in B are desired. Rotating cylindrical or barrel valves are well known in the art and may be readily specified for connections of the suction and discharge sides of the compressor to the vessels to give effectively any such ratio of whole numbers of units on A to whole numbers of units on B. Thus, the relative time allowed for A and B can be optimized; and the desired ratio nearly secured by selecting the number of units on each.

One advantage of the use of two or more similar vessels for operation A and connecting them at different times to the suction of the compressor depends on the fact that, in such a stage-wise operation of the freezing, the one newly connected to the suction will have a lower concentration of solute (if of sea water, 3.5% at the start), while the other will have a much higher concentration (if of sea water, 7% at the end). The depression of the freezing point is substantially greater for the one with greater concentration. Hence, the temperature difference causing crystallizing to proceed can be greater (both will be at the same pressure) for the more dilute, and thus the rate of crystallization will be greater than that of the more concentrated solution.

This illustrates again one basic advantage of a batch freezing process compared to a continuous one. In the continuous process, the ice is always freezing out of the most concentrated brine, 7% as it is being withdrawn, hence the temperature for all ice formation is always the lowest possible; correspondingly, the range of compression of the vapors of refrigerant to cause condensation on and melting of the crystals is always at the maximum while the chance of salt inclusion in the crystals is always the greatest. By comparison, in a batch operation, the freezing of ice is being done from brine varying between 3.5% and 7%, with corresponding lower pressure differences on the compressor, less power consumption, and purer ice crystals.

Further advantage may be taken of the lesser depression of freezing point of more dilute solutions—and hence lesser range necessary for compression of refrigerant vapors—by freezing and concentrating the solution in several stages. This is particularly advantageous in reducing power requirements for large installations or for those where there is a substantial range of concentration between the dilute solution feed and the concentrated solution discharged. In the case of a large plant for sea water, when three units (each operating the freeze or A and the melt or B half of the cycle) are operated to give equal ice and fresh water production from 3.5% salt concentration in sea water, the lowest equilibrium temperature of freezing of the first stage is about −2.5° C., corresponding to a concentration of about 4.2% salt; that of the next stage is −3.3° C. for 5.5% concentration; and that of the third is −4.3° C. for 7.0%.

If lyophilization is used, the range of the vapor pressure for water vapor which must be compressed to that of melting ice at 0° C. is over 50% greater for the last of the ice frozen from 7% salt brine, compared to the last of the ice from 4.2% salt brine. A substantial power saving is thus obtained by freezing out as much as possible of the ice at the higher freezing point of stages with more dilute final brine. The sea water would be fed to the most dilute stage, wherein the freezing point is highest; and concentration would increase by freezing out ice at successively lower temperatures in the several stages. The same advantages of staging in greater or lesser degree will be obtained also with the use of direct refrigerants, as butane, or with indirect refrigerants, as ammonia.

Similarly, in the crystallizing of hydrates, the same advantage is obtained by operation of several units (each accomplishing A and B) at different concentrations of the solution from which water is being separated.

In the utilization of this invention, all of the operations may be synchronized and automatically controlled, whether operating by lyophilization, direct-contact refrigeration—either for freezing out water as ice or as a hydrate—or indirect refrigeration. This may be programmed by a timed cam-type or other control system for the conduction of operation A and operation B, respectively, in the two duplicate vessels (or in three or more).

The several systems of flows of seat water, fresh water, wash water, and brine; and the flow, evaporation, and condensation of the refrigerant in the liquid and in the vapor state may thus be controlled through the proper mechanical operation of valves to open and close according to a prearranged cycle, controlled entirely by changes in time or by changes in both time and temperature, such as that of the freezing point of the brine. Changes in pressures or flow rates may also be used. If a reversible compressor is used, the same device will start, stop, and reverse the compressor motor.

Such mechanically operated valve mechanisms, actuated by changes in time, temperature, pressure, flow rate, or liquid volume—and controlled electrically, hydraulically, or otherwise by a cam or equivalent mechanism—are well known in the art. After suitable adjustment for the specifications of a particular plant of two, three, or more vessels of given size and other characteristics, the control system will allow it to work automatically and with only casual surveillance by the operator.

The entire system consists of a sequence of operations wherein fluids are moved, evaporated, or condensed. The separation and melting of the essential solid phase—whether ice or hydrate—is accomplished without its movement, except in its circulation in a single vessel as a fluid-slurry. Thus, the operations and their automation are simple compared to those of other systems previously available for this purpose.

What is claimed is:

1. A cyclic refrigeration process for separating water from an original aqueous solution, which comprises the following steps:

(a) passing the aqueous solution into the first of two similar vessels;

(b) evaporation of a refrigerant fluid to give vapors in the said first vessel, so as to remove heat from the original aqueous solution therein, to freeze ice crystals therefrom, and to give a more concentrated residual solution, while spraying a mixture of said ice crystals and said more concentrated solution in a dispersed flow through the space occupied by said vapors;

(c) evacuation of the said vapors by the suction of a compression system, while compressing them into the second of the two similar vessels which contains ice crystals;

(d) condensation of the said vapors so as to supply heat in said second vessel to said ice crystals, thus melting them to give water;

(e) separation of the said more concentrated residual aqueous solution of step (b) from the ice crystals formed in the first vessel;

(f) removal of the said water formed in step (d) by the said melting of ice from the second vessel;

(g) passing of an additional amount of said original aqueous solution to the said second vessel and evaporation of the said refrigerant fluid to give vapors so as to remove heat from the original aqueous solution, to freeze ice crystals therefrom, and to give a more concentrated residual solution, while spraying a mixture of said ice crystals and said more concentrated solution in the second vessel in a dispersed flow through the space occupied by the said vapors formed in the second vessel;

(h) evacuation of said vapors formed in step (g) from said second vessel, by the suction of a compression system, while compressing them into the first vessel, which now contains the ice crystals formed in step (b);

(i) condensation of the said vapors of step (h) so as to supply heat to said ice crystals formed in step (b) in said first vessel, thus melting the ice crystals, to give water;

(j) repetition and alternation of the cycle of operations of freezing water, to give ice by evaporation of said refrigerant in one of said similar vessels, while melting ice to give water in the other of said similar vessels.

2. A cyclic refrigeration process for separating water from an original aqueous solution, which comprises the following steps:

(a) passing the aqueous solution into the first of two similar vessels;

(b) evaporation of a refrigerant fluid to give vapors in the said first vessel, so as to remove heat from the original aqueous solution therein, to freeze ice crystals therefrom, and to give a more concentrated residual solution;

(c) evacuation of the said vapors by the suction of a compression system, while compressing them into the second of the two similar vessels which contains ice crystals;

(d) condensation of the said vapors so as to supply heat in said second vessel to said ice crystals, thus melting them to give water, while spraying them while suspended in said water in a dispersed flow through the space occupied by said vapors in said second vessel;

(e) separation of the said more concentrated residual equeous solution of step (b) from the ice crystals formed in the first vessel;

(f) removal of the said water formed in step (d) by the said melting of ice from the second vessel;

(g) passing of an additional amount of said original aqueous solution to the said second vessel and evaporation of the said refrigerant fluid to give vapors so as to remove heat from the original aqueous solution, to freeze ice crystals therefrom, and to give a more concentrated residual solution;

(h) evacuation of said vapors formed in step (g) from said second vessel, by the suction of a compression system, while compressing them into the first vessel, which now contains the ice crystals formed in step (b);

(i) condensation of the said vapors of step (h) so as to supply heat to said ice crystals formed in step (b) in said first vessel, thus melting the ice crystals, to give water, while spraying them while suspended in said water in a dispersed flow through the space occupied by said vapors in said first vessel.

(j) repetition and alternation of the cycle of operations of freezing water, to give ice by evaporation of said refrigerant in one of said similar vessels, while melting ice to give water in the other of said similar vessels.

3. In the process of claim 2 wherein:

during the time of evaporation of vapors and the freezing of ice crystals in the first vessel, the said ice crystals in the first vessel are suspended as a mixture in the more concentrated solution in the first vessel and sprayed in dispersed flow through the space occupied by the said vapors; and during the time of evaporation of vapors and the freezing of ice crystals in the second vessel, the said ice crystals in the second vessel are suspended as a mixture in the more concentrated solution in the second vessel and sprayed in dispersed flow through the space occupied by the said vapors.

4. The process according to claim 2, in which the refrigerant fluid is water present in the original aqueous solution.

5. The process according to claim 2, in which the said refrigerant fluid is substantially insoluble in water; is in direct contact with the said original aqueous solution during the freezing of ice therefrom in either one of the two similar vessels; and the vapors of which are in direct contact with and are condensing on the surface of ice crystals during their melting in the other of the two similar vessels.

6. The process according to claim 2, in which the flow of vapors through the said compression system is always in the same direction; and the said alternation of the cycle of operations of the process is accomplished by opening and closing of valves in branch lines connecting from each of the two similar vessels to the inlet and to the outlet of the compression system, respectively.

7. The process according to claim 2, in which the refrigerant fluid is water present in the original aqueous solution and the compression system iss thermally operated by:

(a) absorption of the vapors of water, acting as the refrigerant, into a concentrated aqueous solution of a hydrophilic material, said vapors being withdrawn from either one of the similar vessels wherein ice crystals are being formed;

(b) passing the said aqueous solution of a hydrophilic materials, after it has absorbed the water vapors to become somewhat more dilute thereby, to a regenerator supplied with a source of heat and operating at a higher pressure and temperature;

(c) evaporating water vapors from said aqueous solution of said hydrophilic material at the higher pressure and temperature of the said regenerator, thereby concentrating this said aqueous solution;

(d) passing said water vapors from the said generator to the other one of the said similar vessels wherein the said more concentrated residual solution has been separated from the ice crystals, so as to melt the ice crystals.

8. The process according to claim 2, in which the compression of refrigerant vapors is done by a mechanical compressor.

9. The process according to claim 8, in which the said evacuation of said vapors from the said first of the two similar vessels and the said compression of the said vapors to the higher pressure of the said second of the two similar vessels, is accomplished by a said mechanically driven compressor, the direction of rotation of which is changed during the said alternation of the cycle of operations, to accomplish the evacuation of vapors from the second vessel and the compression of them to a higher pressure in the first vessel.

10. The process according to claim 1, wherein following the separation of the said more concentrated residual solution from the ice crystals, and before their melting in either of said two similar vessels;

the said ice crystals are washed with an amount of ice cold water to remove any residual surface film thereon of concentrated residual solution.

11. The process according to claim 1, wherein the condensation of the said refrigerant vapors to melt ice crystals previously formed in either of said two similar vessels and the removal of the water formed by said melting is conducted so that:

a first small amount of the refrigerant vapors condense to melt a surface layer of the ice crystals, while removing any surface film of residual concentrated solution; and the water formed by the melting, together with that of any surface film and dissolved impurities is separately drained and removed; and then the further larger amount of the refrigerant vapors condense to melt the major part of the ice, thus giving a more pure water from said melting.

12. The process according to claim 1, in which the said refrigerant fluid is substantially insoluble in the said original aqueous solution, and said refrigerant fluid and said original aqueous solution are in direct contact with each other both during the said removing of heat and the said replacing of heat, in which:

the said removing of heat by said evaporation of a refrigerant fluid causes crystals of a gas hydrate to form between the refrigerant fluid and the water of the aqueous solution in either of said two similar vessels; and the said replacement of heat by said condensation of vapors melts said crystals of the gas hydrate in the other of said two similar vessels.

13. The process according to claim 8, in which the said refrigerant fluid is substantially insoluble in the said original aqueous solution with which it is in direct contact both during the said removing of heat and the said replacing of heat, in which:

the said removing of heat by said evaporation of a refrigerant fluid causes crystals of a gas hydrate to form between the refrigerant fluid and the water of the aqueous solution in either of said two similar vessels; and the said replacement of heat by said condensation of vapors melts said crystals of the gas hydrate in the other of said two similar vessels.

References Cited

UNITED STATES PATENTS

| 3,074,249 | 1/1963 | Henderson | 62—324 |
|---|---|---|---|
| 3,159,474 | 12/1964 | Moloney | 62—324 |
| 3,253,419 | 5/1966 | Thomas | 62—58 |
| 3,385,074 | 5/1968 | Aronson | 62—58 |
| 3,425,235 | 2/1969 | Cox | 62—58 |

NORMAN YUDKOFF, Primary Examiner

A. F. PURCELL, Assistant Examiner